US008878721B2

(12) United States Patent
Werner

(10) Patent No.: US 8,878,721 B2
(45) Date of Patent: Nov. 4, 2014

(54) HYBRID POSITIONING USING TIMING REFERENCE INFORMATION

(75) Inventor: Benjamin A. Werner, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 13/287,873

(22) Filed: Nov. 2, 2011

(65) Prior Publication Data
US 2012/0306691 A1 Dec. 6, 2012

Related U.S. Application Data

(60) Provisional application No. 61/492,737, filed on Jun. 2, 2011.

(51) Int. Cl.
*G01S 19/46* (2010.01)
*G01S 19/03* (2010.01)
*G01S 19/09* (2010.01)

(52) U.S. Cl.
CPC *G01S 19/46* (2013.01); *G01S 19/09* (2013.01)
USPC ................................. 342/357.29; 342/357.4

(58) Field of Classification Search
CPC .......... G01S 19/39; G01S 19/41; G01S 19/46
USPC ............... 342/357.22, 357.24, 357.29, 357.4, 342/450, 451; 701/468, 470
See application file for complete search history.

(56) References Cited

U.S. PATENT DOCUMENTS

| 6,236,359 | B1 | 5/2001 | Watters et al. | |
|---|---|---|---|---|
| 6,975,608 | B1 * | 12/2005 | Park et al. | 370/332 |
| 6,992,999 | B2 * | 1/2006 | Park et al. | 370/332 |
| 7,376,430 | B2 | 5/2008 | Matsuda | |

(Continued)

OTHER PUBLICATIONS

3GPP ED—3GPP: "Stage 2 functional specification of UE positioning in E-UTRAN", Internet Citation, Apr. 1, 2011, pp. 1-52, XP002667444, Retrieved from the Internet: URL:http://www.quintillion.co.jp/3GPP/Specs/36305-930.pdf [retrieved on Jan. 18, 2012], paragraph [7.1.1] paragraph [7.1.2.1] paragraph [8.1.2.2.1.1] figures 7.1.2.1-1.

(Continued)

*Primary Examiner* — Dao Phan
(74) *Attorney, Agent, or Firm* — Kilpatrick Townsend & Stockton LLP

(57) ABSTRACT

Methods and apparatuses for a mobile station to obtain a position fix using synchronous hybrid positioning and asynchronous hybrid positioning techniques are described. In one embodiment, a wireless communication apparatus may transmit a request to a mobile station for timing reference information. The apparatus may be configured to receive the timing reference information, first timing measurements from a first positioning technology, and second timing measurements from a second positioning technology. The apparatus may identify whether the mobile station is capable of supporting synchronous hybrid positioning based on the timing reference information. If it is synchronous hybrid capable, then the apparatus may then establish a position fix for the mobile station using a synchronous hybrid positioning technique that involves relating the first and second timing measurements to a common time scale based on the timing reference information. If it is not synchronous hybrid capable, then the apparatus may establish a position fix for the mobile station using an asynchronous hybrid positioning technique wherein the time scales of the first and second timing measurements are not interrelated.

25 Claims, 6 Drawing Sheets

(56) References Cited

U.S. PATENT DOCUMENTS

| | | |
|---|---|---|
| 7,663,540 B2 | 2/2010 | Oda et al. |
| 7,701,387 B2 | 4/2010 | Syrjarinne |
| 7,978,654 B2 * | 7/2011 | Uemura et al. ............... 370/329 |
| 2008/0129588 A1 | 6/2008 | Lundgren et al. |

OTHER PUBLICATIONS

International Search Report and Written Opinion—PCT/US2011/059431—ISA/EPO—Feb. 7, 2012.

"LTE; Evolved Universal Terrestrial Radio Access (E-UTRA); LTE Positioning Protocol (LPP) (3GPP TS 36.355 version 9.5.0 (Release 9)" Technical Specification, European Telecommunications Standards Institute (ETSI), 650, Route Des Lucioles; F-06921 Sophia-Anti Polis; France, vol. 3GPP Ran 2, No. V9.5.0, Apr. 1, 2011, XP014065377, paragraph [4.1.1] paragraph [05.3] paragraph [6.5.1.1] paragraph [6.5.1.4] paragraph [6.5.1.6] paragraph [6.5.2.1] paragraph [6.5.2.5] -paragraph [6.5.2.6] paragraph [6.5.2.8] figures 4.1.1-1, 5.3.1-1.

* cited by examiner

HYBRID POSITIONING USING TIMING REFERENCE INFORMATION

CROSS-REFERENCE TO RELATED APPLICATIONS

This application claims the benefit of U.S. Provisional Application No. 61/492,737, filed Jun. 2, 2011, and entitled "HYBRID POSITIONING USING A SINGLE BASE STATION IN LTE POSITIONING PROTOCOL," the disclosures of which are expressly incorporated herein by reference in its entirety for all purposes.

BACKGROUND OF THE INVENTION

The present disclosure and various embodiments described herein relate in general to obtaining a position fix of a mobile device, and more specifically to methods and apparatuses for obtaining a position fix of a mobile device using hybrid positioning functionality.

Mobile devices that have the ability to obtain its terrestrial position often do so using Global Positioning System (GPS) receivers and technology. The procedure for obtaining this position is sometimes referred to as obtaining a "position fix." In the vast majority of cases, mobile devices with GPS receivers need to rely on only positioning satellites from a global navigation satellite system (GNSS) to obtain a position fix, such as the American satellite constellation GPS or the Russian system GLONASS (Global Orbiting Navigation Satellite System). Other global satellite systems are in production, such as the European system GALILEO and Chinese system COMPASS.

To calculate a position fix using only GNSS measurements, wireless signals concurrently transmitted from satellites at known locations are used in a process of calculating position of a GPS receiver. The GPS receiver receives the signals from satellites within its view of the sky. The GPS receiver measures the distance between itself and at least three GPS satellites by measuring time delay between transmission and reception of each GPS radio signal. Having the positions of three GPS satellites and distances between the GPS receiver calculates its position using a range-based calculation called trilateration.

For trilateration calculations it is necessary to know the time of transmission and the time of reception of the GPS signal. This allows calculating the distance using the known speed of the signal, which is the speed of light. However, due to even slight inaccuracies in the time keeping of mobile devices, the distances are not exact. Thus, a typical distance calculation includes an uncertainty, sometimes called a time bias or clock bias. The approximate distance calculation plus the clock bias is often called a pseudorange, and it is these pseudoranges that are actually used in trilateration techniques for obtaining a position fix.

To adjust for clock bias, often a fourth satellite in view can be used to solve for this fourth variable, or other times the altitude of the mobile device acts as the fourth constraint.

However, it is not always the case that a mobile device has three or four satellites in view. Mountains, urban areas, and even dense forests may prevent accurate reception from satellites to GPS receivers. Assistance data from location servers on the ground have been created over the years to help improve the accuracy of a position fix and to help compensate for limitations like these. Terrestrial base stations have been installed to help transmit signals to mobile devices that otherwise are not in view of a sufficient number of satellites. These base stations, location servers and other assistance apparatuses are connected via a wireless network to create a system for providing assistance data known as Assistance GPS or A-GPS.

In cases where there are less than three GNSS satellites in view, the A-GPS network has been used to help obtain a position fix by providing base station locations to effectively substitute for the missing satellites. Positioning processes that use multiple positioning technologies, like one or more GNSS satellites plus one or more base stations, are sometimes referred to as hybrid positioning.

There are various A-GPS networks used in telecommunications, built around various cellular communication system protocols, each with different message formats. For example, Radio Resource Location services (LCS) Protocol (RRLP) is used for the Global System for Mobile Communications (GSM) and the Universal Mobile Telecommunications System (UMTS), IS-801 is used for Code Division Multiple Access (CDMA), and Radio Resource Control (RRC) is used for Wideband CDMA (WCDMA) and the Open Mobile Alliance Secure User Plane Location (OMA SUPL).

However, given the global nature of wireless communications and a diversified array of telecommunications carriers that service the millions of mobile devices now, there has grown a need to create more uniform and standardized wireless protocols. The $3^{rd}$ Generation Partnership Project (3GPP) is such an organization that seeks to create a universal standard so that wireless carriers, engineers and researchers can more efficiently improve wireless communications by developing on a common platform. It is argued that the field is converging toward a mobile communications standard called Long-Term Evolution (LTE), which places an emphasis in optimizing data storage and transmission. The LTE Positioning Protocol (LPP) is a message format standard developed for LTE and that defines the message format between a mobile device and the location servers that have been commonly used in A-GPS functionality. The expectations of some in the field are that LPP will be followed uniformly across most or all carriers, creating a need to optimize location servers to efficiently utilize these LPP message formats.

Two areas of message formats in LPP include OTDOA (Observed Time Difference of Arrival) measurements, and FTA (Fine Time Assistance) uplink information. OTDOA measurements pertain to downlink information to mobile devices, or user equipment (UE), from terrestrial base stations, or eNodeBs, as opposed to GNSS satellites and the like. The principle behind OTDOA positioning is similar to GPS. The location determination is typically distributed between the UE and the network. Unlike GPS positioning, the UE does not acquire an accurate reference time, but the position estimate is based on the received time difference of at least two base station cells.

FTA information includes information transmitted from a mobile device to a location server that is in addition to traditional timing and ephemeris data received from GNSS measurements. The information in FTA can be helpful to a location server in calculating more accurate position fixes. FTA information can be retrieved in various A-GPS networks, but their format and content can vary depending on the standard used. LPP in particular has a defined format that differs from all other A-GPS protocols currently devised.

While LPP exhibits many advantages for carriers, and may promise to be the wireless communications protocol standard of the future, the message format protocol also contains limitations as originally intended.

BRIEF SUMMARY OF THE INVENTION

According to an embodiment of the invention, a wireless communications apparatus comprises a transmitter, a receiver and a processor. The transmitter may be configured to transmit a request for timing reference information to a mobile station. The receiver may be configured to receive the timing reference information from the mobile station in response to the request, first timing measurements obtained by the mobile station from a first positioning technology, and second timing measurements obtained by the mobile station from a second positioning technology. The processor may be communicatively coupled to the transmitter and the receiver and configured to identify whether the mobile station is capable of supporting synchronous hybrid positioning based on the timing reference information. If the processor determines that the mobile station is capable of supporting synchronous hybrid positioning, the processor then may establish a position fix for the mobile station using a synchronous hybrid positioning technique by forming one or more pseudoranges for the mobile station based on the first timing measurements and the second timing measurements relative to a common time scale generated based on the timing reference information and establishing the position fix for the mobile station based on the pseudoranges.

According to an embodiment of the invention, the first positioning technology comprises signaling from at least one base station and the timing reference information comprises a system frame number (SFN) associated with the at least one base station. According to another embodiment, the second positioning technology may comprise signaling from a GNSS, the request for timing reference information may comprise a request for FTA associated with the GNSS, and the timing reference information received from the mobile station may comprise the FTA, and wherein the FTA may comprise the SFN and a quantified uncertainty threshold value. According to another embodiment, the quantified uncertainty threshold value may comprise a value of less than 1 microsecond.

According to an embodiment of the invention, the first positioning technology comprises signaling from at least one base station. The second positioning technology comprises signaling from a GNSS. The timing reference information comprises a SFN associated with the at least one base station and GNSS timing reference data. The first timing measurements and the second timing measurements may be calculated by the mobile station in relation to a time scale of the at least one base station based on the SFN.

According to an embodiment of the invention, if the processor determines that the mobile station is not configured to support synchronous hybrid positioning, then the processor may be further configured to establish a position fix for the mobile station using an asynchronous hybrid positioning technique with respect to the first timing measurements and the second timing measurements, wherein a time scale for the first timing measurements and a time scale for the second timing measurements are not interrelated.

According to an embodiment of the invention, the first positioning technology comprises signaling from one base station and the second positioning technology comprises signaling from a GNSS.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
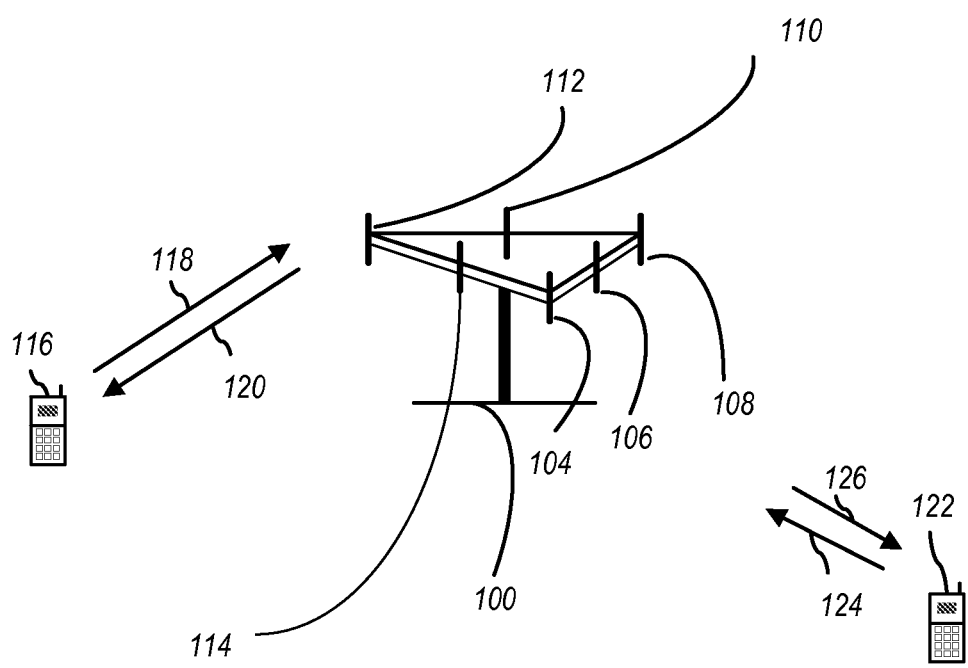
FIG. 1 is a graphical illustration of an example wireless communication system.

Techniques are provided for supporting mobile stations having synchronous hybrid positioning capability ("synchronous-capable" stations) and mobile stations lacking synchronous hybrid positioning capability ("non-synchronous-capable" stations) in a wireless communication network. Hybrid positioning generally refers to techniques that utilize multiple positioning technologies, such as satellite-aided navigation via a global navigation satellite system (GNSS), terrestrial positioning using observed time difference of arrival (OTDOA) measurements with respect to one or more base stations or other reference points, etc. The synchronous-capable stations may utilize synchronous hybrid positioning techniques, which are generally defined as techniques that utilize two or more positioning technologies, and where the timing measurements resulting from the two or more positioning technologies are related on a common time scale. Non-synchronous-capable stations may utilize asynchronous hybrid positioning techniques, which are generally defined as techniques that utilize two or more positioning technologies, and the timing measurements resulting from the two or more positioning technologies are not interrelated onto a common time scale.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring to FIG. 1, a multiple access wireless communication system according to some embodiments is illustrated. An access point (AP) 100 includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a Frequency Division Duplex (FDD) system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
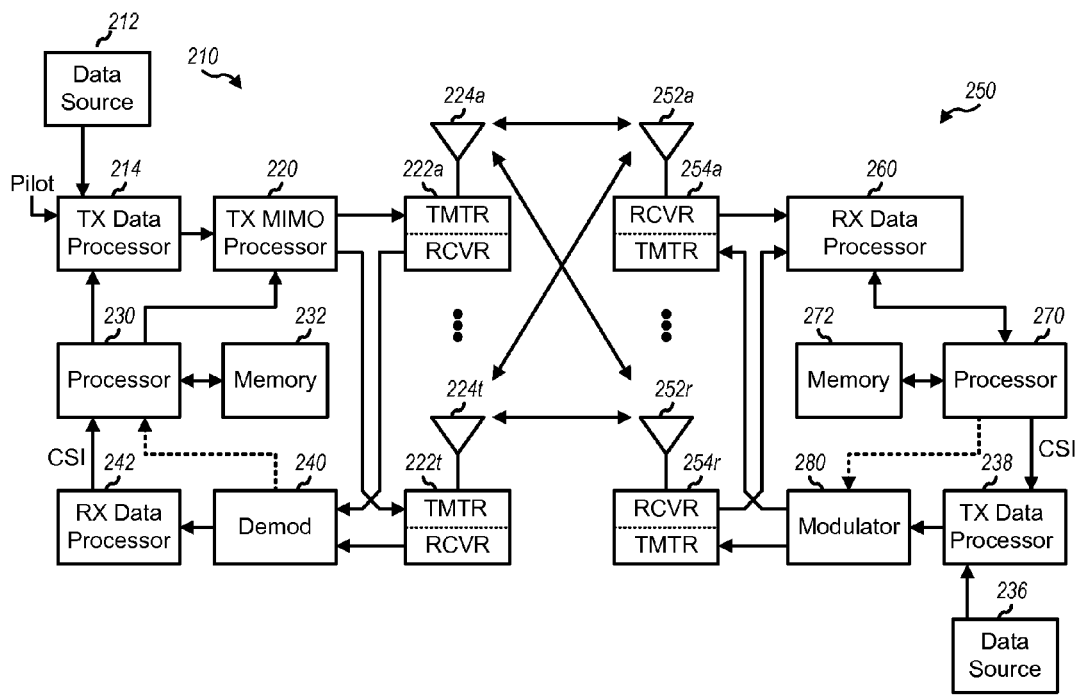
FIG. 2 is a graphical illustration of an example wireless network environment that can be employed in conjunction with the various systems and methods described herein.

FIG. 2 is a block diagram of an embodiment of a transmitter system 210 (also known as the access point) and a receiver system 250 (also known as access terminal) in a multiple-input and multiple-output (MIMO) system 200. At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. Memory 272 stores the various pre-coding matrices that are used by processor 270.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message. Processor 230 obtains the pre-coding matrices from memory 232, which stores various pre-coding matrices.

Figure 3:
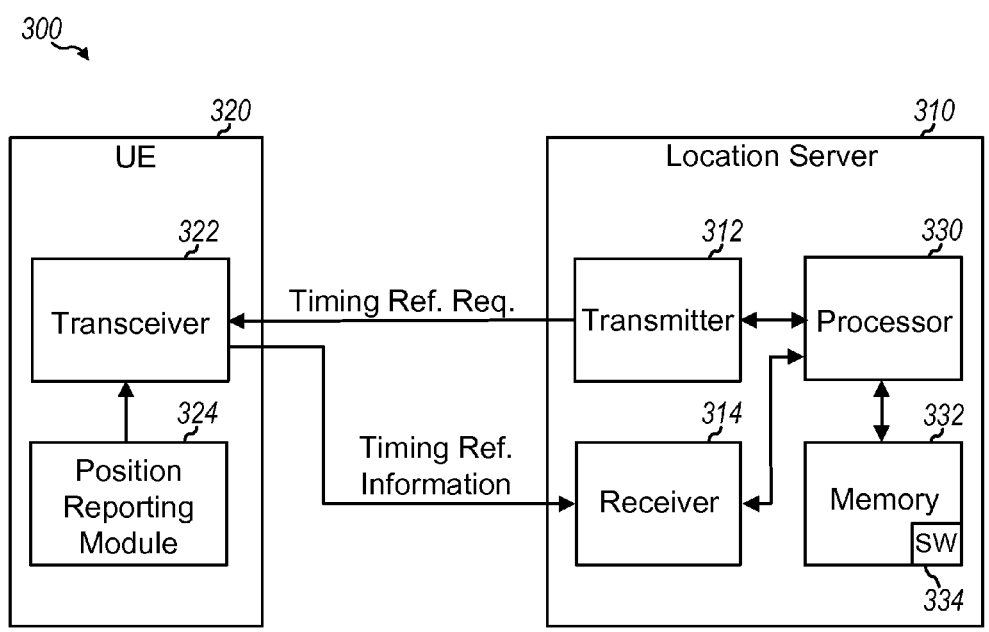
FIG. 3 is a block diagram of a system for establishing a position fix for a device operating in a wireless communication environment.

FIG. 3 illustrates an exemplary system 300 for establishing a position fix for a device operating in a wireless communication environment that includes a location server 310 and a UE 320. The location server 310 is configured to conduct position fixing or other techniques to determine the location of UE 320 within a wireless communication system. In some embodiments, location server 310 contains a transmitter 312, a receiver 314, a processor 330 and a memory 332 that contains software 334. Processor 330 performs position fix calculations for synchronous-capable and non-synchronous capable UEs 320. Distinguishing between synchronous and non-synchronous capable devices is advantageous because some A-GPS message format protocols, such as LPP, do not natively contain functionality that is designed to support hybrid positioning, and methods and apparatuses used to solve for this deficiency may depend on the functionality of each mobile device. Specifically, protocols like LPP lack message formats that can normalize OTDOA measurements from base stations, and GNSS measurements from satellites, on a common time scale. This is important at least in the cases where a UE 320 tries to obtain a position fix with less than three GNSS satellites in view. The UE 320 will need to obtain pseudoranges from base stations or other non-GNSS positioning objects, coupled with GNSS satellites, but needs a way to compare all the transmit and receive times of each positioning technology (e.g. satellite, base station, etc.) uniformly.

In general, there is a need to create a network system that can relate the timing reference information (e.g. OTDOA measurements, GNSS measurements, etc.) from different positioning technology onto a common time scale, while still being compliant in the specified format protocol, in the event that the message format protocols like LLP do not natively support a uniform comparison.

The present invention addresses these issues in various ways. For example, the location server 310 distinguishes between synchronous-capable and non-synchronous-capable mobile stations by sending, via a transmitter 312, requests for information indicative of synchronous hybrid positioning capability to a reference base station, not shown, which then passes the requests to respective mobile stations such as UE 320. These requests can include timing reference information requests or other suitable requests. For instance, location server 310 can request fine time assistance (FTA) information corresponding to a GNSS from UE 320. The FTA information includes a system frame number (SFN) in addition to a quantified measurement uncertainty between the SFN and GNSS code phases. In response to the request, UE 320 utilizes a position reporting module 324 or other means to identify and report the requested information. In the case of a FTA request, the reported information includes the requested FTA and a timing uncertainty value. In response to a request for FTA, a synchronous-capable UE 320 utilizes a transceiver 322 to return FTA information that includes the SFN and the quantified measurement uncertainty value. This uncertainty value may report a value below a threshold (e.g., less than 1 microsecond) that signals to location server 310 that the code phases between the GNSS and SFN are sufficiently aligned. In contrast, a non-synchronous-capable UE 320 either returns no FTA or provides FTA with a high degree of uncertainty (e.g., greater than 1 microsecond).

In other embodiments, the location server 310 requests timing reference information from UE 320 and receives back FTA and OTDOA (Observed time difference of arrival) measurements. The OTDOA measurements are derived from timing differentials from two or more base stations in view. In other embodiments, after the request from location server 310, UE 320 may send back to location server 310 timing reference information associated with the reference base station. This timing reference information may include information that tells which base station the SFN originated from.

The timing reference information and/or other responsive information communicated by UE 320 is received at location server 310 via a receiver 314. Location server 310 may also include a processor 330 and/or memory 332, which can implement some or all of the described functionality of location server 310. Memory 332 can be any suitable non-transitory processor-readable storage medium and can contain software 334 or other mechanisms to cause processor 330 to perform one or more desired actions.

Figure 4:
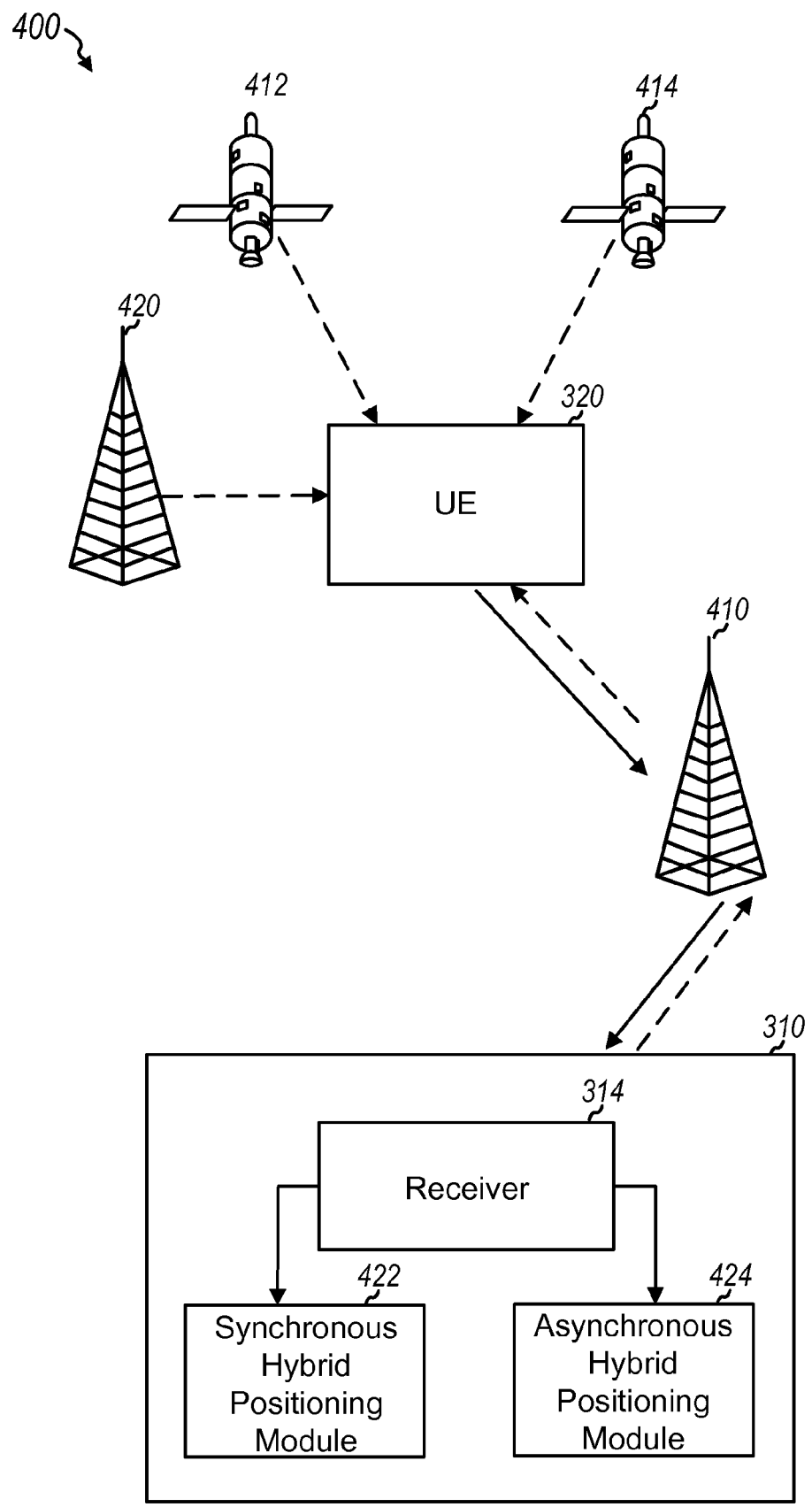
FIG. 4 is a block diagram of a system for conducting hybrid positioning in a wireless communication system.

FIG. 4 illustrates a system 400 for conducting hybrid positioning in a wireless communication system. The following description is given in relation to a wireless communication system using the LTE Positioning Protocol (LPP); however, other positioning mechanisms are also possible. Positioning is initiated within system 400 when a location server 310 receives timing measurements from a UE 320 via a reference base station 410. Timing measurements obtained by a UE 320 that is determined to be synchronous-capable may correspond to multiple sources, such as GNSS signals from satellites or other space vehicles (SV) 412 and 414, OTDOA measurements corresponding to time differentials from terrestrial base stations 410 and 420, etc. These timing measurements are used by location server 310 to obtain a position fix for the UE 320.

In the event that the UE 320 is synchronous-capable, the location server 310 performs synchronous hybrid positioning (via a synchronous hybrid positioning module 422), in which the location server 310 determines the transmission time of network events (system frame boundaries, positioning reference signals, etc.) and GNSS signals. As a synchronous-capable UE 320 effectively provides a continuous time scale upon which the time of arrival of GNSS measurements and network events have been received, the location server 310 can then identify differences between the transmission times and the received times to form pseudoranges for UE 320 with a single time bias. The pseudoranges are, in turn, utilized to obtain a position fix for UE 320 via any suitable technique (e.g., least squares, weighted least squares, etc.). Pseudoranges, as used herein, are defined as a ranging measurement that accounts for range and time bias (e.g., difference between receiver time and global time). Pseudoranges can be formed as described above for any combined number of SVs 412 and/or base stations 420 equal to or greater than three, including positioning for a single base station 410. Accordingly, in some cases, measurements from base station pairs are not needed in the positioning calculations, in contrast to conventional positioning techniques. In some cases, hybrid positioning may be performed for a set of measurements in which the total number of SVs 412 and the total number of base stations 410 are both individually less than three.

Alternatively, if UE 320 is a non-synchronous-capable station, the location server 310 can alternatively utilize an asynchronous hybrid positioning module 424 or other means to obtain a position fix for UE 320 using an asynchronous hybrid positioning technique in which the time scales of the GNSS and OTDOA measurements are not interrelated.

The following descriptions illustrate particular embodiments of the invention. These embodiments do not encompass the entire invention and serve as examples only, as more embodiments can be derived readily by persons with ordinary skill in the art.

The "1 Base Station, 2 Space Vehicle" Case

Referring again to FIG. 4, in certain embodiments of the invention, a position fix of a synchronous-capable UE 320 may be obtained when there are only the following three position reference sources in view: a single base station (BS) 410 and two space vehicles (SV) 412 and 414. In this case, the location server 310 will request GNSS measurements and FTA information from UE 320 via reference BS 410. UE 320 will transmit back the GNSS measurements and FTA information to location server 310. The FTA information contains a system frame number (SFN), information that specifies that the SFN originated from reference BS 410, and a quantified measurement uncertainty value that represents the code phase difference between GNSS measurements and SFN measurements. The SFN originates from BS 410 because UE 320 uses BS 410 as the reference base station to interact with the wireless communications network that includes modules like location server 310. Location server 310 receives the GNSS measurements and FTA information at receiver 314 from UE 320 via BS 410. Then, location server 310 checks to see if UE 320 is synchronous-capable by checking for the existence of the aforementioned FTA information and identifying whether the quantified measurement uncertainty is less than a designated threshold. For example, this uncertainty threshold may be 1 microsecond. Upon confirming UE 320 is synchronous-capable, synchronous hybrid position module 422 synchronizes the GNSS measurements and SFN on a common time scale based on the SFN and a known offset between the GNSS measurements and SFN. The synchronous hybrid positioning module 422 then calculates a position fix, using the two GNSS measurements and the SFN measurement to form three pseudoranges, calculates the position fix based on these three pseudoranges and transmits this position back to UE 320.

The "2 Base Station, 1 Space Vehicle" Case

Still referring to FIG. 4, in other embodiments of the invention, a position fix of a synchronous-capable UE 320 may be obtained when there are only the following three position reference sources in view: two BSs 410 and 420 and one SV 412. The synchronous hybrid positioning module calculates a position fix using different information than the 1 BS 2 SV case. Here, the location server 310 requests from UE 320 GNSS measurements and FTA information, along with OTDOA measurements that represent the time difference of arrival to the UE 320 between BSs 410 and 420. UE 320 will transmit back the GNSS measurements, FTA information and OTDOA measurements via BS 410. The FTA information contains the SFN that originates from BS 410, information that tells that the SFN originated from BS 410, and a quantified measurement uncertainty value. The OTDOA measurements are formed based on the time difference of arrival of position reference signals (PRSs) that are transmitted by all configured base stations. The availability of PRS can be configured by the network operator to allow for range based network positioning via reported OTDOA measurements. Location server 310 receives the GNSS measurements, FTA information, and OTDOA measurements at receiver 314, and then checks whether UE 320 is synchronous-capable using methods similar or identical to the 1 BS, 2 SV case. Upon confirming UE 320 is synchronous-capable, synchronous hybrid position module 422 synchronizes the GNSS measurements, network SFN and OTDOA measurements on a common time scale based on the SFN, a known offset between the GNSS measurements and SFN, and a known offset between the PRS occurrence that produced the OTDOA measurements and the SFN. The synchronous hybrid positioning module 422 then calculates a position fix, using the GNSS measurement of SV 412 and OTDOA measurements between BSs 410 and 420 to form three pseudoranges, calculates the position fix based on these three pseudoranges and transmits this position back to UE 320.

In some embodiments, not more than one SFN is obtained out of all of the base stations in view, because the UE 320 does not obtain downlink information from more base stations than just the reference base station 410. Therefore, the 1 BS, 2 SV implementation described above cannot be employed in the 2 BS, 1 SV case. Instead, a position fix is obtained by synchronizing the OTDOA measurements, described above.

The "2 Base Station, 2 Space Vehicle" Case

Still referring to FIG. 4, in other embodiments of the invention, a position fix of a synchronous-capable or non-synchronous capable UE 320 may be obtained when there are only the following four position references sources in view: two BSs 410 and 420 and two SVs 412 and 414. In this case, the location server 310 requests from UE 320 GNSS measurements for both SVs 412 and 414, FTA information, and OTDOA measurements of BSs 410 and 420. UE 320 may or may not provide FTA information, depending on whether UE 320 is synchronous-capable. Location server 310 determines whether UE 320 is synchronous-capable based at least on whether it received FTA information from UE 320. If so, synchronous hybrid positioning module 422 can perform a position fix using the methods described in both the 1 BS, 2 SV and 2 BS, 1 SV cases. Performing both calculations provides UE 320 with a more precise position fix.

However, even if UE 320 is not synchronous-capable, a position fix can still be obtained using the asynchronous hybrid positioning module 424. What is lacking in the non-synchronous capable configuration is a common time scale that synchronizes timing events from multiple position reference types. This lack of a common time scale may be viewed as creating an unconstrained time bias between network and SV measurements, and can be solved for by incorporating measurements from an extra BS or SV. This lack of a common time scale may also be referred to as an asynchronous time scale. Asynchronous hybrid position module 424 therefore calculates a position fix but on an asynchronous time scale, and then transmits this position back to UE 320.

In contrast with some embodiments of the present invention, under known LPP implementations in the art, cases where there are not more than two SVs and two BSs in view of the UE 320 cannot normally obtain a position fix. This is because a minimum of three position reference sources must be in view of the UE, and LPP does not natively support a synchronous-capable UE 320 that can obtain a position fix using a combination of position reference sources from different position reference types (e.g. GNSS, base stations, etc.).

Additionally, certain embodiments of the present invention provide solutions for obtaining a pseudorange using only 1 BS in LPP, also unlike known implementations in the art. LPP natively provides OTDOA measurements as the only intended format for transmitting position and timing data for base stations. However, by definition of OTDOA—which provides measurements based on differences between two base stations—this data is made available only when there at least two base stations in view. Certain embodiments of the present invention employ data manipulation of message formats of LPP in ways different than their intended uses, such that a position fix can be obtained in cases that utilize only 1 BS. For example, the SFN obtained from a reference BS 410 can act as a ranging measurement to UE 320, even though the SFN was not originally intended for this purpose.

Furthermore, persons with ordinary skill in the art would understand that system frame numbers (SFNs) of network events and GNSS measurements are not conventionally intended to be utilized in ways that are disclosed in various embodiments of the invention. The present invention employs methods and apparatuses that utilize timing reference information, such as SFNs in ways other than their intended purposes.

Exemplary FTA Uplink Information Using LPP Message Formats

Referring to Table 1, the following message format may be found in the LTE Positioning Protocol (LPP) and may contain exemplary information that may represent Fine Time Assistance (FTA) Uplink Information and other information used to obtain a synchronous or asynchronous position fix. The message in Table 1 may be a type of message that a location server requests from a mobile device. In one embodiment, the field "networkTime" and all subfields within may represent FTA information and may be shown to be "OPTIONAL," and thus may or may not be received back from the mobile device, depending on if the mobile device is configured to provide such information. It can be seen that the field "systemFrameNumber" is a subfield within the optional "networkTime" field, and may be used to relate SV measurements and BS measurements onto a common time scale, consistent with methods described within this disclosure. In one embodiment, if a mobile device is configured to return the "networkTime" information back to a location server upon request, then the "systemFrameNumber" can be obtained and the mobile device may be referred to as being synchronous-capable. On the other hand, if the mobile device is not capable of returning this information, then the location server will know that the mobile device cannot provide hybrid synchronous information, based on the fact that it did not receive this information. It may then be said that the mobile device is non-synchronous-capable.

TABLE 1

Example Message Format in LPP that may contain FTA information

```
MeasurementReferenceTime ::= SEQUENCE {
    gnss-TOD-msec        INTEGER (0..3599999),
    gnss-TOD-frac        INTEGER (0..3999)            OPTIONAL,
    gnss-TOD-unc         INTEGER (0..127)             OPTIONAL,
    gnss-TimeID          GNSS-ID,
    networkTime          CHOICE {
        eUTRA    SEQUENCE {
                    physCellId              INTEGER (0..503),
                    cellGlobalId            CellGlobalIdEUTRA-AndUTRA    OPTIONAL,
                    systemFrameNumber       BIT STRING (SIZE (10)),
                    ...
                 },
        uTRA     SEQUENCE {
                    mode                    CHOICE {
                                                fdd    SEQUENCE {
                                                            primary-CPICH-Info    INTEGER (0..511),
                                                            ...
                                                        },
                                                tdd    SEQUENCE {
                                                            cellParameters        INTEGER (0..127),
                                                            ...
                                                        }
                                            },
                    cellGlobalId            CellGlobalIdEUTRA-AndUTRA    OPTIONAL,
                    referanceSystemFrameNumber
                                            INTEGER (0..4095),
                    ...
                 },
        gsM      SEQUENCE {
                    bcchCarrier             INTEGER (0..1023),
                    bsic                    INTEGER (0..63),
                    cellGlobalId            cellGlobalIdGERAN            OPTIONAL,
                    referenceFrame          SEQUENCE {
                                                referenceFN        INTEGER (0..65535),
                                                referenceFNMSB     INTEGER (0..63)      OPTIONAL,
                                                ...
                                            },
                    deltaGNSS-TOD           INTEGER (0 .. 127)    OPTIONAL,
                    ...
                 },
    }        OPTIONAL,
    ...
}
```

In other embodiments, the location server may also request a quantified uncertainty threshold value, which may correspond to the field "gnss-TOD-unc" in Table 1. This field may be an integer value representing an exponent value used to calculate the uncertainty in the accuracy of GNSS measurements, expressed in microseconds. In some embodiments, this calculation may be based on the following formula:

$$r = C*(((1+x)^K)-1)$$

where r is the uncertainty of GNSS measurements, expressed in microseconds, C=0.5, x=0.14 and K is the value of "gnss-TOD-unc." In some embodiments, if "gnss-TOD-unc" yields an uncertainty calculation r of less than 1 microsecond, then the GNSS measurements may be considered to be sufficiently accurate to relate onto a common time scale with BS measurements. This field is also listed as "OPTIONAL" in Table 1, which again may suggest that a mobile station may or may not be configured to supply this information. In some embodiments, a mobile device may be "synchronous-capable" or "non-synchronous-capable" depending further on whether the "gnss-TOD-unc" is supplied by the mobile device, and whether this field yields an uncertainty calculation of less than 1 microsecond.

Calculating Pseudorange and Obtaining a Position Fix

The following description provides additional context for the positioning techniques described above for at least one embodiment of the invention, namely a system utilizing LPP. The following description provides merely one way in which positioning can be carried out and other techniques, positioning protocols, etc., are possible.

OTDOA measurements are considered a type of ranging measurement. In some cases, OTDOA measurements can be combined with GNSS measurements on the same time scale, allowing for "synchronous hybrid" fixes. In other cases where a handset lacks the ability to measure GNSS signals with respect to network events, an "asynchronous hybrid" fix can be obtained.

An OTDOA system in which OTDOA measurements can be used with GNSS measurements exhibits two properties. First, the transmit time of the base stations used to formulate OTDOA measurements is known with respect to a GNSS time. This information is presumed to be available in the base station almanac (BSA) given by a carrier in the form of forward link calibration information and position reference signal information. Second, a receiver time scale is available with which all GNSS and OTDOA arrivals are measured. LPP places all GNSS measurements on the same time scale, as well as OTDOA measurements. However, the relationship between the two measurement types can only be implicitly known using the fine time assistance (FTA) uplink functionality.

In the navigation engine, GNSS and OTDOA measurements will have pseudoranges p formed based on the known transmit times $t_{tx}$ and the local receiver clock $t_{rx}$. This pseudorange can be thought of as the time of flight at the speed of light c over range r plus an unknown offset between the receiver time scale and the transmitter time scale t.

$$t_{rx} - t_{tx} = p = r/c + t$$

After forming these pseudoranges, the weighted least squares algorithm is applied to the pesudorange equations (and other observation equations) in order to estimate the unknown position and time bias.

The transmit times are converted to GNSS time in the analysis below. Additionally, the local receiver clock time is defined so as to be a good initial estimate of the GPS time given the information available to the MS and server. The following equations show how the transmission and receive times are calculated for GNSS measurements. $SFN_{GNSS}$ is given in the GNSS measurement block when the MS supports it and the server requests it. $FLCInfo_{serving}$ is a SFN and slot number that would have been transmitted at the epoch of the GNSS system. Further, a calibration value from the start of the slot being broadcast at GPS epoch is given. $\hat{t}_{GNSS}$ is the approximate GNSS time given with the GNSS measurements, or time received from NTP on the server upon receiving the GNSS measurements. $f_{SFNtoGNSS}$ turns SFNs into GNSS time given that $\hat{t}_{GNSS}$ is within +/−5 seconds of actual GNSS time. $\phi^{GNSSi}$ is the phase of the GNSS measurement as seen in the GNSS measurement block. $\hat{R}_{MS}^{GNSSi}$ is the estimated range from MS to the GNSS satellite. This estimated range is calculated from knowing the approximate GNSS time (+/−0.5 microseconds) of transmission in order to position the SV, and the approximate mobile position (+/−150 km) so as to calculate the correct millisecond. The transmission time of both GPS and GLONASS signals is generally 1 ms from the GNSS epoch. The following equation applies for GNSS measurements GNSSi=1 ... N.

$$t_{tx}^{GNSSi} = \text{round}\left[\frac{f_{SFNtoGNSS}(SFN_{GNSS}, FLCInfo_{Serving}, \hat{t}_{GNSS}) + \phi^{GNSSi} - R_{MS}^{GNSSi}/c}{1\ ms}\right] * 1\ ms$$

The transmission time of the OTDOA measurements can also be calculated in GNSS time. OTDOA measurements represent the time difference of arrival between the reference PRS signal and a neighbor PRS. The PRS of the reference is referred to as PRS0. Measured neighbors are PRSi=1 ... M. $SFN_{OTDOA}$ is present with the OTDOA measurement block. $PRSInfo_{Ref}$ will be available in the BSA. $f_{tx\Delta}$ computes the offset from system frame start at which the PRS is transmitted due to the PRS configuration.

$$t_{tx}^{PRS0} = f_{SFNtoGNSS}(SFN_{OTDOA}, FLCInfo_{Ref}, \hat{t}_{GNSS}) + f_{tx\Delta}(SFN_{OTDOA}, PRSInfo_{Ref})$$

The transmit times of the other PRS signals are reported in a way that allows the transmit time to be calculated as the same for all PRS signals. Only the time difference from the nearest LTE slot is reported. Therefore, the transmit time of the neighboring cell can be thought of as follows.

$$FLCInfo_{Ref/i} = \{SFN_{Ref}, Slot_{Ref}, FLC_i\}$$

$$t_{tx}^{PRSi} = f_{SFNtoGNSS}(SFN_{OTDOA}, FLCInfo_{Ref/i}, \hat{t}_{GNSS}) + f_{tx\Delta}(SFN_{OTDOA}, PRSInfo_{Ref})$$

The calibration value still changes the transmit time because its value is less than an LTE slot of time.

A local receiver clock is defined as well. This clock is defined such that it is close to the actual GNSS time, and such that the measurements' time of arrivals to the MS are preserved. The time of arrival of a GNSS measurement is computed as follows.

$$t_{rx}^{GNSSi} = f_{SFNtoGNSS}(SFN_{GNSS}, FLCInfo_{Serving}, \hat{t}_{GNSS}) + \phi^{GNSSi}$$

The time of arrival of a PRS is defined as follows. Note that if there are M OTDOA measurements, the MS observed M+1 PRSs.

$$t_{rx}^{PRS0} = f_{SFNtoGNSS}(SFN_{OTDOA}, FLCInfo_{Ref}, \hat{t}_{GNSS}) + f_{tx\Delta}(SFN_{OTDOA}, PRSInfo_{Ref}) - FLC_{Ref}$$

$$t_{rx}^{PRSi} = f_{SFNtoGNSS}(SFN_{OTDOA}, FLCInfo_{Ref|i}, \hat{t}_{GNSS}) + f_{tx\Delta}(SFN_{OTDOA}, PRSInfo_{Ref}) + \phi^{OTDOAi} - FLC_i$$

Figure 5:
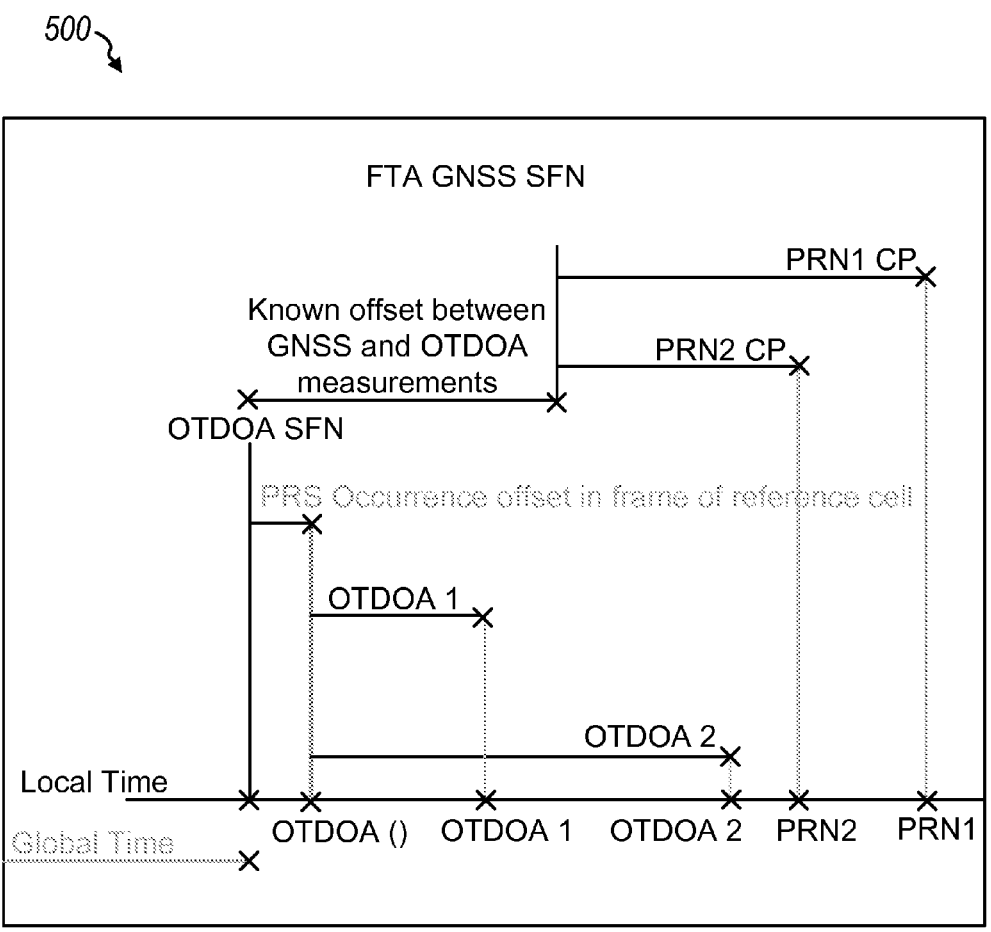
FIG. 5 is a graphical illustration of timing information utilized by an example hybrid positioning technique.

$FLC_{Ref}$ is subtracted from the receive time of PRS0 in order to preserve the time of arrival between the GNSS measurements and the OTDOA measurements, as shown in FIG. 5. As shown in FIG. 5, both code phases of the GNSS are measured with respect to SFN. Code phase refers to a delay at which a correlation peak (CP) occurs in a given chip. By analyzing SFN, PRN1 CP and PRN2 CP, passage of time can be inferred.

The above calculations assume that the reference base station used for OTDOA measurements is the same as the serving base station from which GNSS measurements are taken. If they are not the same, the server may calculate the time difference between system frame numbers of the two base stations.

Once the transmit times are calculated and the receiver clock times have been set up, pseudoranges can be calculated. In the case of the GNSS measurements, the pseudorange can be calculated as shown when the transmitted SFN boundary occurs close to a GNSS millisecond.

$$p_{PRS0} = -FLC_{Ref}$$

$$p_{PRSi} = \phi^{OTDOAi} - FLC_i$$

$$p_{GNSS1} = \phi^{GNSSi} + \text{round}\left[\frac{(\hat{R}_{MS}^{GNSSi}/c) - \phi^{GNSSi}}{1 \text{ ms}}\right] * 1 \text{ ms}$$

In the case where there are no OTDOA measurements, but a SFN is present with the GNSS measurements, it is possible to use this SFN as a single pseudorange from the serving base station. Formulating the pseudorange for the SFN is similar to the PRS case, except there is no offset from the frame for a PRS signal. The pseudorange calculation stays the same.

$$t_{tx}^{PRS0} = f_{SFNtoGNSS}(SFN_{OTDOA}, FLCInfo_{Ref}, \hat{t}_{GNSS})$$

$$t_{tx}^{PRS0} = f_{SFNtoGNSS}(SFN_{OTDOA}, FLCInfo_{Ref}, \hat{t}_{GNSS}) - FLC_{Ref}$$

$$p_{PRS0} = -FLC_{Ref}$$

When the GNSS measurements are not accompanied by any SFN, it cannot be assumed that the measurements are taken with respect to any network events. In this case, it is still possible to do hybrid solutions in some cases. Instead of considering GNSS and OTDOA measurements to be on a common time scale, two different time scales are used for the measurements types. If enough measurements are available, this can still yield a fix.

If an SFN is present with the GNSS measurements, it may be the case that a noncompliant handset would not properly align the measurements of the two systems. If this is the case, the navigation algorithm will use the normal detection algorithms (RAIM and SMO) in order to determine whether there is a relationship between GNSS and network measurements. When it is determined that the relationship is improbable, the navigation algorithm will attempt to yield a fix using two different time scales under the asynchronous hybrid positioning module 424.

Turning to FIG. 5, schematic 500 illustrates an example set of events that can be synchronized on a common time scale using various embodiments of the present invention. For example, when a UE 320 is detected to be synchronous-capable, the known offset between GNSS and OTDOA measurements becomes fixed, adding a constraint and thus requiring less position reference sources to obtain a position fix. In another example, when a UE 320 is detected to not be synchronous-capable, the offset between GNSS and OTDOA measurements needs to be determined, requiring at least one additional position reference source. In either case, schematic 500 shows an example of how the phase of the pseudorandom number (PRN) sequences from space vehicles, for example PRN1 and PRN2, can be synchronized on a common Local Time scale with OTDOA measurements, for example OTDOA 1 and OTDOA 2, from base stations. For example, the OTDOA SFN from a known reference base station acts as a common time reference, because the offsets between GNSS measurements and SFN, and OTDOA measurements and SFN, are known in synchronous-capable mobile devices.

Figure 6:
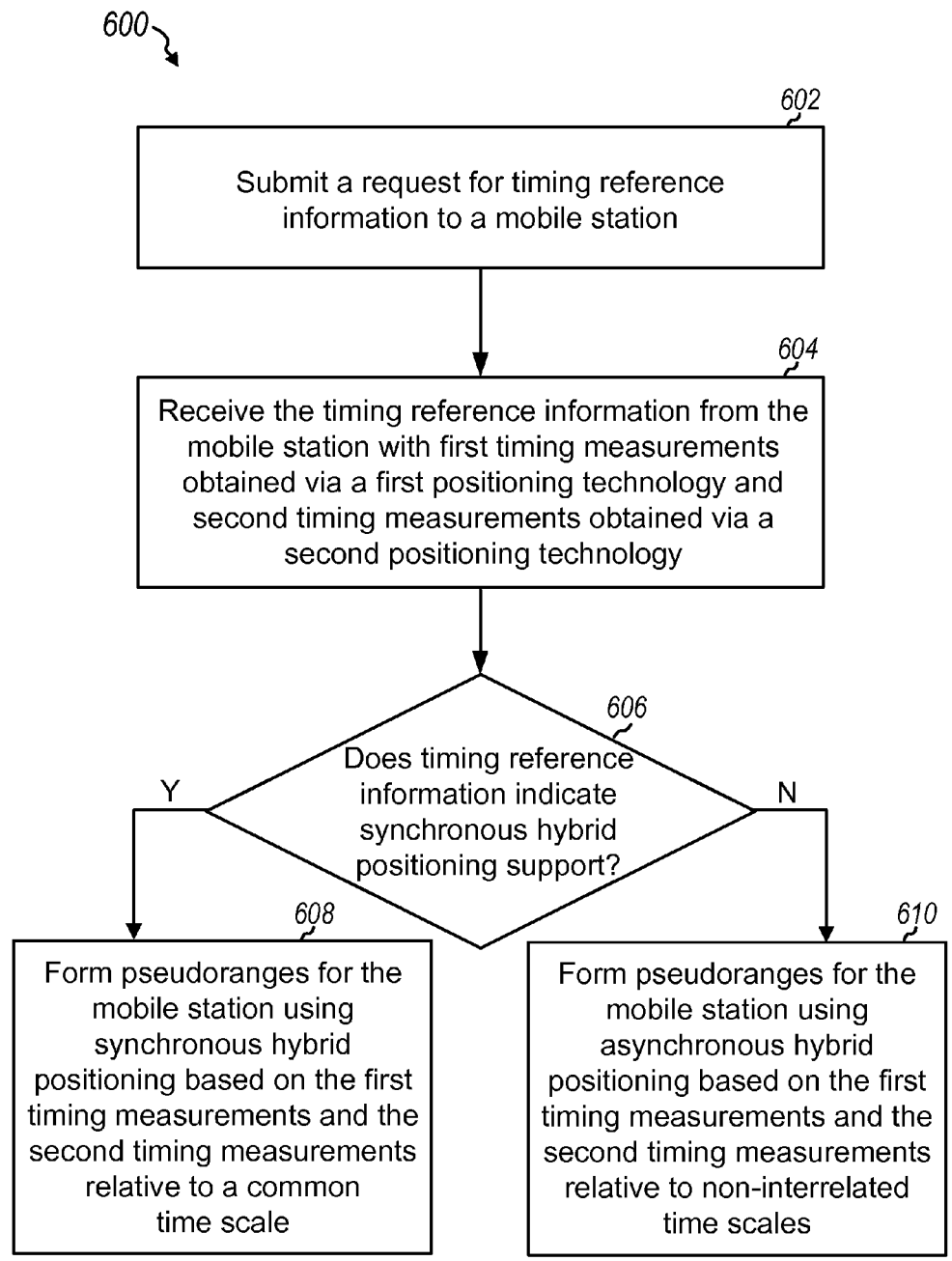
FIG. 6 is a block flow diagram of a process of obtaining a position fix for a mobile station in a wireless communication system via hybrid positioning.

Turning to FIG. 6, with further reference to FIGS. 1-5, a process 600 of obtaining a position fix for a mobile station in a wireless communication system via hybrid positioning includes the stages shown. The process 600 is, however, an example only and not limiting. The process 600 can be altered, e.g., by having stages added, removed, rearranged, combined, and/or performed concurrently. Still other alterations to the process 600 as shown and described are possible. At stage 602, a request for FTA is submitted to a mobile station. At stage 604, the FTA is received from the mobile station with first timing measurements obtained via a first positioning technology and second timing measurements obtained via a second positioning technology. For example, first timing measurements could be GNSS measurements with FTA information, a first positioning technology could be a GPS satellite, second timing measurements could be OTDOA measurements, and a second positioning technology could be network base stations. In another example, first timing measurements could be GNSS measurements, a first positioning technology could be a GPS satellite, second timing measurements could be FTA information containing a network SFN and information telling that the SFN originated from a reference base station, and a second positioning technology could be network base stations. At stage 606, it is determined whether the received timing reference information indicates synchronous hybrid positioning support. For example, it could be determined whether GNSS measurements included FTA information. If FTA is identified, process 600 concludes at stage 608 by forming pseudoranges for the mobile station using synchronous hybrid positioning based on the first timing measurements and the second timing measurements relative to a common time scale. Otherwise, process 600 concludes at stage 610 by forming pseudoranges for the mobile station using asynchronous hybrid positioning based on the first timing measurements and the second timing measurements relative to non-interrelated time scales.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A wireless communications apparatus comprising:
   a transmitter configured to transmit a request for timing reference information to a mobile station;
   a receiver configured to receive the timing reference information from the mobile station in response to the request, first timing measurements obtained by the mobile station from a first positioning technology, and second timing measurements obtained by the mobile station from a second positioning technology; and
   a processor communicatively coupled to the transmitter and the receiver and configured to:
      identify whether the mobile station is capable of supporting synchronous hybrid positioning based on the timing reference information; and
      if the mobile station is capable of supporting synchronous hybrid positioning, establish a position fix for the mobile station using a synchronous hybrid positioning technique; and
      if the mobile station is not capable of supporting synchronous hybrid positioning, establish the position fix for the mobile station using an asynchronous hybrid positioning technique.

2. The wireless communications apparatus of claim 1, wherein the synchronous hybrid positioning technique comprises:
   forming one or more pseudoranges for the mobile station based on the first timing measurements and the second timing measurements relative to a common time scale generated based on the timing reference information, and establishing the position fix for the mobile station based on the pseudoranges.

3. The wireless communications apparatus of claim 1, wherein the asynchronous hybrid positioning technique comprises:
   forming one or more pseudoranges for the mobile station based on the first timing measurements and the second timing measurements, wherein a time scale for the first timing measurements and a time scale for the second timing measurements are not interrelated.

4. The wireless communications apparatus of claim 1 wherein the first positioning technology comprises signaling from at least one base station and the timing reference information comprises a system frame number (SFN) associated with the at least one base station.

5. The wireless communications apparatus of claim 4, wherein the second positioning technology comprises signaling from a global navigation satellite system (GNSS), the request for timing reference information comprises a request for fine time assistance (FTA) associated with the GNSS, and the timing reference information received from the mobile station comprises the FTA, and wherein the FTA comprises the SFN and a quantified uncertainty threshold value.

6. The wireless communications apparatus of claim 5, wherein the quantified uncertainty threshold value comprises a value of less than 1 microsecond.

7. The wireless communications apparatus of claim 1 wherein:
   the first positioning technology comprises signaling from at least one base station;
   the second positioning technology comprises signaling from a global navigation satellite system (GNSS);
   the timing reference information comprises a system frame number (SFN) associated with the at least one base station and GNSS timing reference data; and
   the first timing measurements and the second timing measurements are calculated by the mobile station in relation to a time scale of the at least one base station based on the SFN.

8. The wireless communications apparatus of claim 1 wherein the first positioning technology comprises signaling from one base station and the second positioning technology comprises signaling from a global navigation satellite system (GNSS).

9. A method comprising:
   transmitting a request for timing reference information to a mobile station;

receiving the timing reference information from the mobile station in response to the request, first timing measurements obtained by the mobile station from a first positioning technology, and second timing measurements obtained by the mobile station from a second positioning technology;

identifying whether the mobile station is capable of supporting synchronous hybrid positioning based on the timing reference information; and if the mobile station is capable of supporting synchronous hybrid positioning, establishing a position fix for the mobile station using a synchronous hybrid positioning technique, and if the mobile station is not capable of supporting synchronous hybrid positioning, establishing the position fix for the mobile station using an asynchronous hybrid positioning technique.

10. The method of claim 9, wherein the synchronous hybrid positioning technique comprises:

forming one or more pseudoranges for the mobile station based on the first timing measurements and the second timing measurements relative to a common time scale generated based on the timing reference information, and establishing the position fix for the mobile station based on the pseudoranges.

11. The method of claim 9, wherein the asynchronous hybrid positioning technique comprises:

forming one or more pseudoranges for the mobile station based on the second timing measurements, wherein a time scale for the first timing measurements and a time scale for the second timing measurements are not interrelated.

12. The method of claim 9 wherein the first positioning technology comprises signaling from at least one base station and the timing reference information comprises a system frame number (SFN) associated with the at least one base station.

13. The method of claim 12 wherein the second positioning technology comprises signaling from a global navigation satellite system (GNSS), the request for timing reference information comprises a request for fine time assistance (FTA) associated with the GNSS, and the timing reference information received from the mobile station comprises the FTA, and wherein the FTA comprises the SFN and a quantified uncertainty threshold value.

14. The method of claim 9 wherein:
the first positioning technology comprises signaling from at least one base station;
the second positioning technology comprises signaling from a a global navigation satellite system (GNSS);
the timing reference information comprises a system frame number (SFN) associated with the at least one base station and GNSS timing reference data; and
the first timing measurements and the second timing measurements are calculated by the mobile station in relation to a time scale of the at least one base station based on the SFN.

15. The method of claim 9 wherein the first positioning technology comprises signaling from one base station and the second positioning technology comprises signaling from a global navigation satellite system (GNSS).

16. A wireless communications apparatus comprising:
means for transmitting a request for timing reference information to a mobile station;
means for receiving the timing reference information from the mobile station in response to the request, first timing measurements obtained by the mobile station from a first positioning technology, and second timing measurements obtained by the mobile station from a second positioning technology;

means for identifying whether the mobile station is capable of supporting synchronous hybrid positioning based on the timing reference information; and means for establishing a position fix for the mobile station using a synchronous hybrid positioning technique, if the mobile station is capable of supporting synchronous hybrid positioning, and means for establishing the position fix for the mobile station using an asynchronous hybrid positioning technique, if the mobile station is not capable of supporting synchronous hybrid positioning.

17. The wireless communications apparatus of claim 16, wherein the synchronous hybrid positioning technique comprises:

forming one or more pseudoranges for the mobile station based on the first timing measurements and the second timing measurements relative to a common time scale generated based on the timing reference information, and establishing the position fix for the mobile station based on the pseudoranges.

18. The wireless communications apparatus of claim 16, wherein the asynchronous hybrid positioning technique comprises:

forming one or more pseudoranges for the mobile station based on the first timing measurements and the second timing measurements, wherein a time scale for the first timing measurements and a time scale for the second timing measurements are not interrelated.

19. The wireless communications apparatus of claim 16 wherein:
the first positioning technology comprises signaling from at least one base station;
the second positioning technology comprises signaling from a global navigation satellite system (GNSS);
the request for timing reference information comprises a request for fine time assistance (FTA) associated with the GNSS;
the timing reference information received from the mobile station comprises the FTA; and
the FTA comprises a system frame number (SFN) associated with the at least one base station and a quantified uncertainty threshold value.

20. The wireless communications apparatus of claim 16 wherein:
the first positioning technology comprises signaling from at least one base station;
the second positioning technology comprises signaling from a global navigation satellite system (GNSS);
the timing reference information comprises a system frame number (SFN) associated with the at least one base station and GNSS timing reference data; and
the first timing measurements and the second timing measurements are calculated by the mobile station in relation to a time scale of the at least one base station based on the SFN.

21. A computer program product residing on a non-transitory processor-readable medium and comprising processor-readable instructions configured to cause a processor to:
transmit a request for timing reference information to a mobile station;
receive the timing reference information from the mobile station in response to the request, first timing measurements obtained by the mobile station from a first positioning technology, and second timing measurements obtained by the mobile station from a second positioning technology;

identify whether the mobile station is capable of supporting synchronous hybrid positioning based on the timing reference information; and establish a position fix for the mobile station using a synchronous hybrid positioning technique, if the mobile station is capable of supporting synchronous hybrid positioning, and establish the position fix for the mobile station using an asynchronous hybrid positioning technique, if the mobile station is not capable of supporting synchronous hybrid positioning.

22. The computer program product of claim 21 wherein the synchronous hybrid positioning technique comprises:

forming one or more pseudoranges for the mobile station based on the first timing measurements and the second timing measurements relative to a common time scale generated based on the timing reference information, and establishing the position fix for the mobile station based on the pseudoranges.

23. The computer program product of claim 21 wherein the asynchronous hybrid positioning technique comprises:

forming one or more pseudoranges for the mobile station based on the first timing measurements and the second timing measurements, wherein a time scale for the first timing measurements and a time scale for the second timing measurements are not interrelated.

24. The computer program product of claim 21 wherein:

the first positioning technology comprises signaling from at least one base station;

the second positioning technology comprises signaling from a global navigation satellite system (GNSS);

the request for timing reference information comprises a request for fine time assistance (FTA) associated with the GNSS;

the timing reference information received from the mobile station comprises the FTA; and the FTA comprises a system frame number (SFN) associated with the at least one base station and a quantified uncertainty threshold value.

25. The computer program product of claim 21 wherein:

the first positioning technology comprises signaling from at least one base station;

the second positioning technology comprises signaling from a global navigation satellite system (GNSS);

the timing reference information comprises a system frame number (SFN) associated with the at least one base station and GNSS timing reference data; and the first timing measurements and the second timing measurements are performed by the mobile station in relation to a time scale of the at least one base station based on the SFN.

\* \* \* \* \*